US012416267B2

(12) United States Patent
De Leon et al.

(10) Patent No.: US 12,416,267 B2
(45) Date of Patent: Sep. 16, 2025

(54) EXHAUST SYSTEM FOR AN INTERNAL COMBUSTION ENGINE

(71) Applicant: Volvo Truck Corporation, Gothenburg (SE)

(72) Inventors: Aurora De Leon, Gothenburg (SE); Karsten Rohrssen, Gråbo (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/799,157

(22) Filed: Aug. 9, 2024

(65) Prior Publication Data
US 2025/0059924 A1    Feb. 20, 2025

(30) Foreign Application Priority Data

Aug. 15, 2023 (EP) ..................................... 23191479

(51) Int. Cl.
*F02D 9/10* (2006.01)
*F02D 41/14* (2006.01)

(52) U.S. Cl.
CPC ......... *F02D 9/1005* (2013.01); *F02D 9/1065* (2013.01); *F02D 41/1448* (2013.01)

(58) Field of Classification Search
CPC .. F02D 9/1005; F02D 9/1065; F02D 41/1448; F02D 9/06; F02D 9/1025; F02D 2250/34; F02D 41/0007; F01N 9/00; F01N 2240/36; F01N 2390/02; F01N 2390/06; F01N 2900/1411; Y02T 10/12
USPC ....................................................... 123/337
See application file for complete search history.

(56) References Cited

U.S. PATENT DOCUMENTS

2003/0019470 A1    1/2003  Anderson et al.
2019/0017447 A1    1/2019  Fesl et al.

FOREIGN PATENT DOCUMENTS

| CN | 113330203 A | 8/2021 | |
| DE | 102015200253 A1 | 7/2015 | |
| JP | H0326268 Y2 * | 6/1991 | |
| JP | 2007231791 A * | 9/2007 | ............. F01N 13/10 |

(Continued)

OTHER PUBLICATIONS

JP-H0326268-Y2 (Jun. 6, 1991) (Machine Translation) (Year: 1991).*

(Continued)

*Primary Examiner* — Hung Q Nguyen
(74) *Attorney, Agent, or Firm* — Sage Patent Group

(57) ABSTRACT

The present disclosure relates to an exhaust system for an internal combustion engine. The exhaust system comprises an exhaust conduit adapted to fluidly connect the internal combustion engine to a turbine of a turbo and a valve comprising a valve flap located in the exhaust conduit in a position between the internal combustion engine and the turbine. The valve flap is pivotally connected to at least a portion of the exhaust conduit. The exhaust system further comprises an actuator adapted to impart a load on at least a portion of the valve to thereby control a pivotal position of the valve flap in the exhaust conduit to thereby control a gas flow via the exhaust conduit and an actuator load sensor adapted to detect load information indicative of a magnitude of the load that the actuator currently imparts on at least the portion of the valve.

15 Claims, 6 Drawing Sheets

(56) References Cited

FOREIGN PATENT DOCUMENTS

WO          9837320 A1    8/1998
WO    2010151391 A1   12/2010

OTHER PUBLICATIONS

Extended European Search Report, European Patent Application No. 23191479.7, mailed Feb. 6, 2024, 7 pages.

* cited by examiner

EXHAUST SYSTEM FOR AN INTERNAL COMBUSTION ENGINE

CROSS REFERENCE TO RELATED APPLICATIONS

This application claims priority to European Patent Application No. 23191479.7, filed on Aug. 15, 2023, the disclosure and content of which is incorporated by reference herein in its entirety.

TECHNICAL FIELD

The disclosure relates generally to an exhaust system for an internal combustion engine. In particular aspects, the disclosure relates to an exhaust system comprising a valve. The disclosure can be applied to heavy-duty vehicles, such as trucks, buses, construction equipment, ships, boats among other vehicle and vessel types. Although the disclosure may be described with respect to a particular vehicle, the disclosure is not restricted to any particular vehicle.

BACKGROUND

An internal combustion engine system generally comprises an exhaust system. Generally, such an exhaust system may comprise an exhaust conduit adapted to fluidly connect the internal combustion engine to a turbine of a turbo such that exhaust gases produced by the internal combustion engine may be fed to the turbine. Moreover, contemporary internal combustion engine systems may comprise a valve in the exhaust conduit which valve for instance may be used when it is desired to operate the internal combustion engine system in an engine braking mode. It is not uncommon to control such a valve in response to a detected pressure, e.g. in response to a so called exhaust gas counterpressure upstream of the valve or a pressure downstream of the valve. A pressure, such as any one of the above pressures, is generally measured by a pressure sensor. However, a pressure sensor may be exposed to relatively high pressures and/or other loads such as thermal loads. This in turn results in rather strict requirements on the pressure sensor as such as well as on the connection between the pressure sensor and a portion of the internal combustion engine system.

SUMMARY

According to a first aspect of the disclosure, there is provided an exhaust system for an internal combustion engine. The exhaust system comprises an exhaust conduit adapted to fluidly connect the internal combustion engine to a turbine of a turbo. The exhaust system further comprises a valve comprising a valve flap located in the exhaust conduit in a position between the internal combustion engine and the turbine, as seen in a direction of flow from the internal combustion engine to the turbine, when the exhaust conduit fluidly connects the internal combustion engine to the turbine. The valve flap is pivotally connected to at least a portion of the exhaust conduit. The exhaust system further comprises an actuator adapted to impart a load on at least a portion of the valve to thereby control a pivotal position of the valve flap in the exhaust conduit to thereby control a gas flow via the exhaust conduit. The exhaust system further comprises an actuator load sensor adapted to detect load information indicative of a magnitude of the load that the actuator currently imparts on at least the portion of the valve. The first aspect of the disclosure may seek to provide alternative information relating to a current condition in the exhaust conduit. A technical benefit may include that instead of, or in addition to, measuring a pressure upstream or downstream the valve flap in order to assess a condition in the exhaust conduit, the magnitude of the load that the actuator currently imparts on at least the portion of the valve may present useful information relating to the condition in the exhaust conduit.)

Optionally, in some examples, the valve comprises a valve lever located at least partially outside the exhaust conduit, the actuator being adapted to impart a load on at least a portion of the valve lever to thereby control the position of the valve flap in the exhaust conduit. A technical benefit may include that the actuator may be arranged outside the exhaust conduit, which implies a more benign environment as compared to the environment within the exhaust conduit.

Optionally, in some examples, the valve flap is rigidly connected to the valve lever, preferably the valve flap and the valve lever form a unitary component. A technical benefit may include an appropriate control of the valve flap.

Optionally, in some examples, the actuator is a linear actuator. A technical benefit may include an appropriate control of the valve flap.

Optionally, in some examples, the actuator is a fluid power actuator and the actuator load sensor is adapted to detect a fluid pressure value indicative of a fluid pressure of the fluid powering the actuator. A technical benefit may include that the fluid pressure may be measured in a straightforward manner, for instance by means of a pressure sensor that need not be exposed to the high pressure differences and/or thermal loads that a pressure sensor measuring the pressure in the exhaust conduit would be exposed to.

Optionally, in some examples, the actuator is an electric actuator and the actuator load sensor is adapted to detect an electric power value indicative of an electric power fed to the electric actuator. A technical benefit may include that the electric power value may be measured in a straightforward manner.

Optionally, in some examples, the valve flap is pivotally connected to the exhaust conduit around a pivot axle that is located at least partially in or outside a side wall delimiting the exhaust conduit. A technical benefit may include that the movement of the valve flap may be controlled in an appropriate manner.

Optionally, in some examples, the exhaust system further comprises a control system adapted to receive load information from the actuator load sensor and to issue control information to the actuator in response to the load information. A technical benefit may include that the condition, e.g. the position, of the valve flap may be controlled in an appropriate manner without necessarily needing information obtained from one or more pressure sensors measuring the pressure in the exhaust conduit for instance.

Optionally, in some examples, the control system is adapted to determine a counterpressure value, indicative of a current exhaust gas counterpressure in the exhaust conduit, upstream of the valve flap, as seen in a direction of flow from the internal combustion engine to the turbine, on the basis of the load information. A technical benefit may include that the condition, e.g. the position, of the valve flap may be controlled in an appropriate manner without necessarily needing information obtained from one or more pressure sensors measuring the pressure in the exhaust conduit for instance.

Optionally, in some examples, the control system is adapted to receive information indicative of a rotational speed of a compressor of the turbo as well as information about a current charge air pressure downstream the compressor, the control system being adapted to determine an actual air mass flow downstream the compressor on the basis of the counterpressure value, the information about the current charge air pressure downstream the compressor and the information indicative of the rotational speed of the compressor. A technical benefit may include that the condition, e.g. the position, of the valve flap may be controlled in an appropriate manner without necessarily needing information obtained from one or more pressure sensors measuring the pressure in the exhaust conduit for instance.

According to a second aspect of the disclosure, there is provided an internal combustion engine system comprising an internal combustion engine, a turbo, which in turn comprises a turbine, and an exhaust system of the first aspect of the present disclosure.

Optionally, in some examples, the turbo comprises a compressor and the internal combustion engine system comprises an inlet conduit adapted to fluidly connect the compressor to the internal combustion engine.

Optionally, in some examples, the internal combustion engine system further comprises an intake throttle valve adapted to control an air mass flow via the inlet conduit, the control system being adapted to control the intake throttle valve in response to a target air mass flow and the actual air mass flow.

According to a third aspect of the disclosure, there is provided a vehicle comprising an exhaust system of the first aspect of the disclosure and/or an internal combustion engine system of the second aspect of the disclosure.

According to a fourth aspect of the disclosure, there is provided a method for controlling an internal combustion engine system comprising an internal combustion engine, a turbo, which in turn comprises a turbine, and an exhaust system. The exhaust system comprises an exhaust conduit adapted to fluidly connect the internal combustion engine to the turbine of the turbo. The exhaust system further comprises a valve comprising a valve flap located in the exhaust conduit in a position between the internal combustion engine and the turbine, as seen in a direction of flow from the internal combustion engine to the turbine. The valve flap is pivotally connected to at least a portion of the exhaust conduit. The exhaust system further comprises an actuator adapted to impart a load on at least a portion of the valve to thereby control a pivotal position of the valve flap in the exhaust conduit to thereby control a gas flow via the exhaust conduit. The exhaust system further comprises an actuator load sensor adapted to detect load information indicative of a magnitude of the load that the actuator currently imparts on at least the portion of the valve. The method comprises:

detecting the load information, and
controlling the actuator in response to the load information.

The fourth aspect of the disclosure may seek to provide an appropriate way of controlling the above-mentioned actuator and consequently the position of the valve flap. A technical benefit may include that instead of, or in addition to, measuring a pressure upstream or downstream the valve flap in order to control the above-mentioned actuator, it has been realized that the load information may present useful information when controlling the actuator.

Optionally, in some examples, the method further comprises determining a counterpressure value, indicative of a current exhaust gas counterpressure in the exhaust conduit, upstream of the valve flap, as seen in a direction of flow from the internal combustion engine to the turbine, on the basis of the load information. A technical benefit may include an appropriate control of the actuator since the counterpressure value may form relevant information when controlling the actuator.

Optionally, in some examples, the turbo comprises a compressor and the method further comprises determining information indicative of a rotational speed of a compressor of the turbo as well as information about a current charge air pressure downstream the compressor, the method further comprising determining an actual air mass flow downstream the compressor on the basis of the counterpressure value, the information about the current charge air pressure downstream the compressor and the information indicative of the rotational speed of the compressor. A technical benefit may include that the air mass flow may be determined in an appropriate manner.

Optionally, in some examples, the internal combustion engine system comprises an inlet conduit adapted to fluidly connect the compressor to the internal combustion engine, the internal combustion engine system further comprising an intake throttle valve adapted to control an air mass flow via the inlet conduit, the method comprising controlling the intake throttle valve in response to a target air mass flow and the actual air mass flow. A technical benefit may include that e.g. an engine braking operating condition may be achieved in a straightforward manner.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

For an internal combustion engine system, it may be desired to control the exhaust gases leaving the internal combustion engine. For instance, it may be desired to achieve a relatively high exhaust gas counterpressure downstream the internal combustion engine. Purely by way of example, such a relatively high exhaust gas counterpressure may be desired during an engine braking operation of the internal combustion engine. As another non-limiting example, a relatively high exhaust gas counterpressure may be desired during a so called heat mode of the internal combustion engine.

The disclosure may seek to control the exhaust gas in an appropriate manner. A technical benefit may include an increased versatility in the control of exhaust gas characteristics.

Figure 1:
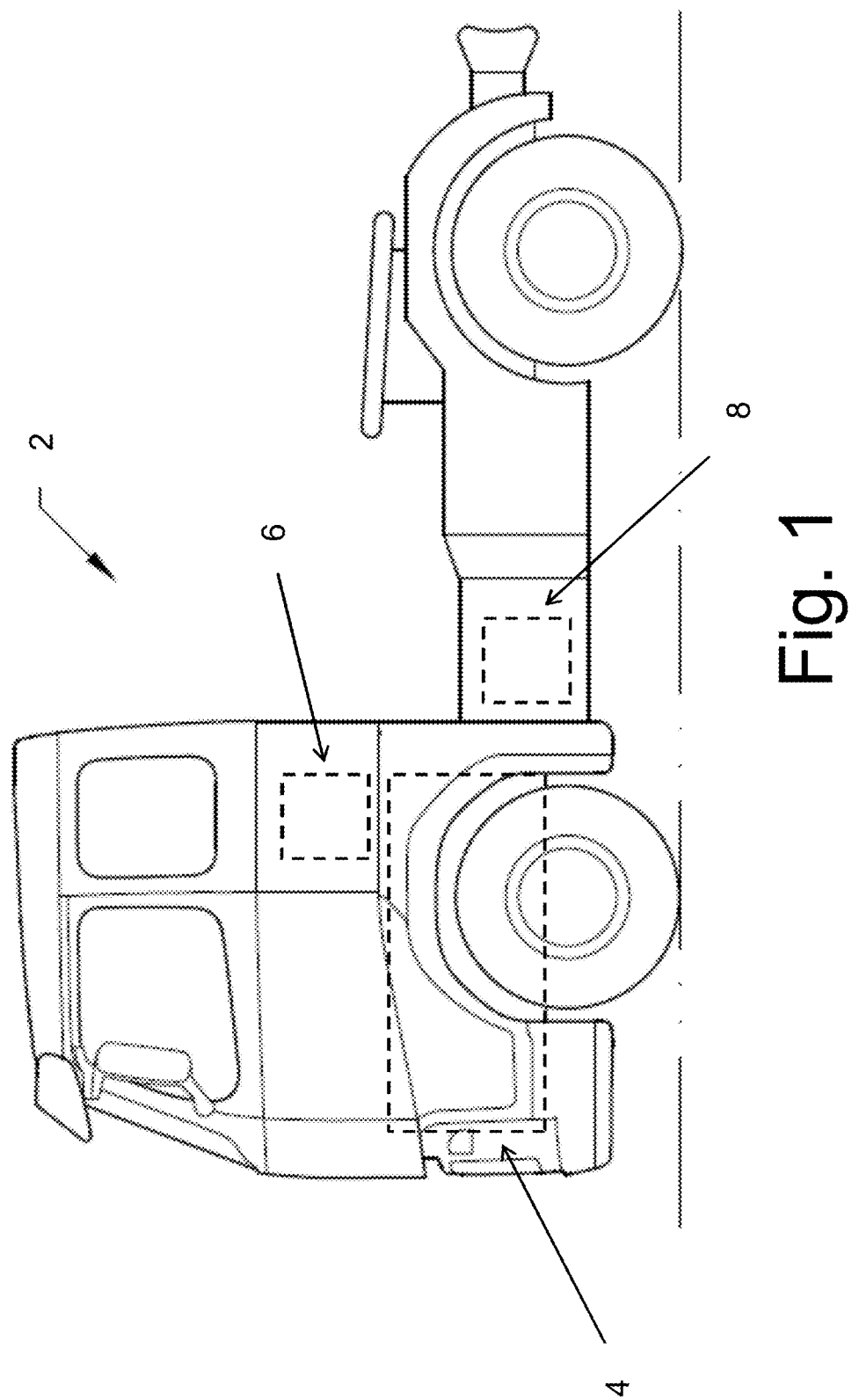
FIG. 1 is an exemplary side view of a vehicle.

FIG. 1 is an exemplary embodiment of the present disclosure, comprising a side view of a vehicle 2, in the form of a truck, according to an example.

Whilst the shown embodiment illustrates a truck, the disclosure may relate to any vehicle, such as a car, bus, industrial vehicle, boat, ship, etc., wherein motive power may be derived from an internal combustion engine.

The vehicle 2 comprises an internal combustion engine system 4. Moreover, the internal combustion engine system 4 may also comprise a control system 6.

The vehicle 2 may further comprise an exhaust aftertreatment system 8. As a non-limiting example, the exhaust aftertreatment system 8 may comprise a catalyst (not shown) and/or a particle filter (not shown). Purely by way of example, the exhaust aftertreatment system 8 may form part of the internal combustion engine system 4 and this applies to any example of the internal combustion engine system 4 of the present disclosure.

Figure 2:
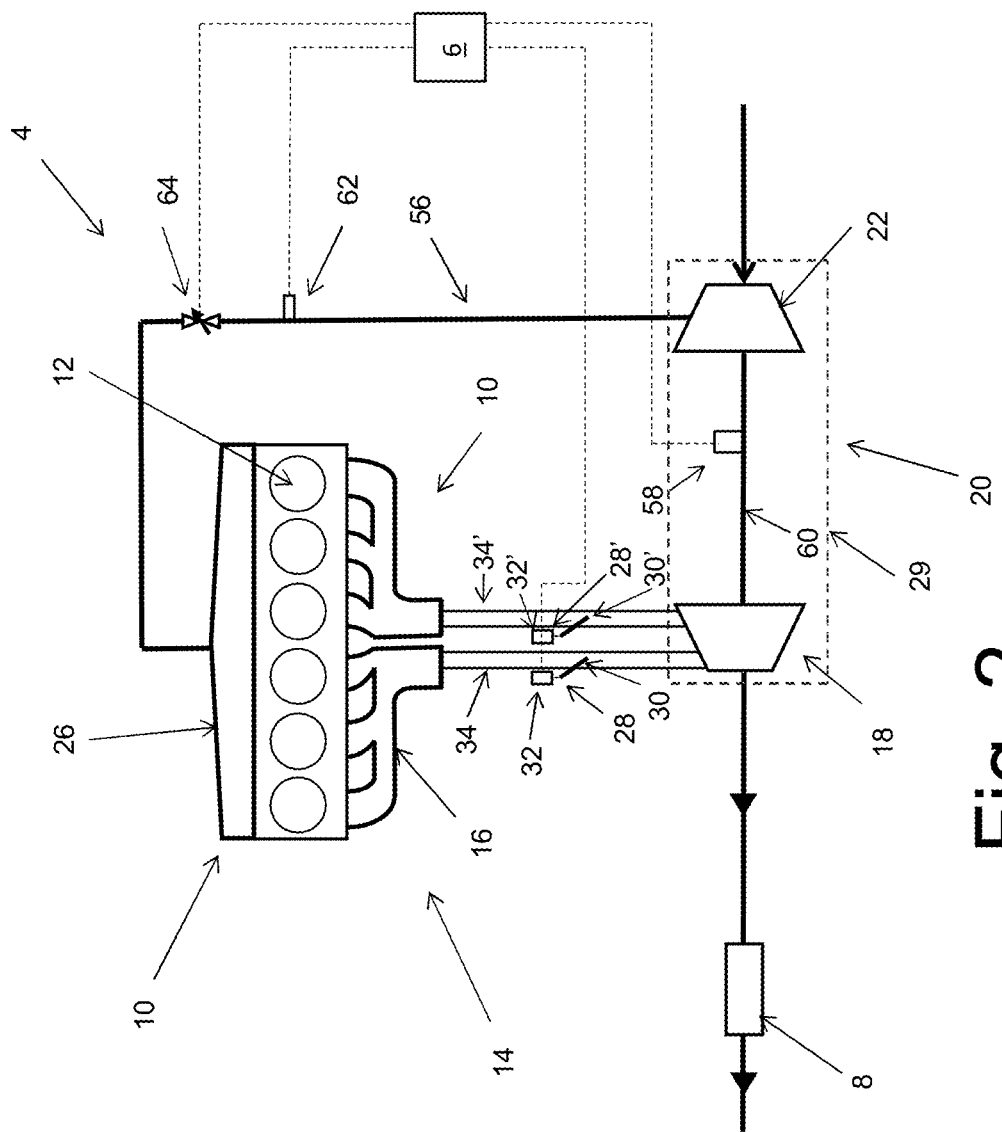
FIG. 2 is a schematic view of an exemplary internal combustion engine system.

FIG. 2 shows an example of an internal combustion engine system 4. Purely by way of example, the FIG. 2 internal combustion engine system 4 may be used in the vehicle 2 of FIG. 1.

The internal combustion engine system 4 comprises an internal combustion engine 10. The internal combustion engine 10 comprises a cylinder 12. In the shown embodiment the internal combustion engine 10 comprises six cylinders 12, however the combustion engine 10 may comprise any number of cylinders 12, for example the internal combustion engine 10 may comprise four, six, or eight cylinders 12.

Moreover, as indicated in FIG. 2, the internal combustion engine system 4 comprises an exhaust system 14. The exhaust system 14 comprises an exhaust conduit 16 adapted to fluidly connect the internal combustion engine 10 to a turbine 18 of a turbo 20. In the FIG. 2 example, the internal combustion engine system 4 comprises a turbo 20 which comprises the above-mentioned turbine 18 as well as a compressor 22 being mechanically connected to the turbine 18.

Again with reference to FIG. 2, the exhaust system 14 further comprises a valve 28 comprising a valve flap 30 located in the exhaust conduit 16 in a position between the internal combustion engine 10 and the turbine 18, as seen in a direction of flow from the internal combustion engine 10 to the turbine 18, when the exhaust conduit 16 fluidly connects the internal combustion engine 10 to the turbine 18. The valve flap 30 is pivotally connected to at least a portion of the exhaust conduit 16. The exhaust system 14 further comprises an actuator 32 adapted to impart a load on at least a portion of the valve 28 to thereby control a pivotal position of the valve flap 30 in the exhaust conduit to thereby control a gas flow via the exhaust conduit 16. As a non-limiting example, which however may be applicable to any example of the present disclosure, the turbo 20 comprising the turbine 18 and the compressor 22 may be accommodated in a turbo housing 29 and the valve flap 30 may be located upstream the turbo housing 29, as seen in a direction of flow from the internal combustion engine 10 to the turbine 18.

In the FIG. 2 example, the exhaust conduit 16 comprises two branches 34, 34', each one of which fluidly connecting an individual set of cylinders of the internal combustion engine 10 to the turbine 18. Moreover, in the FIG. 2 example, the exhaust system 14 comprises two valves 28, 28', one for each branch 34, 34'. Each valve 28, 28' comprises a valve flap 30, 30' and an actuator 32, 32'. However, other examples of the exhaust conduit 16 may comprise a single conduit (not shown in FIG. 2) connecting all cylinders of the internal combustion engine 10 to the turbine 18 and such an example may have a single valve 28. It is also envisaged that in other examples of the exhaust conduit, a single actuator may control the movement of more than one valve flap. Purely by way of example, it is envisaged that a single actuator may control the movement of flaps in separate branches of the exhaust conduit 16.

Irrespectively of how the valve 28 is implemented, the valve 28 may be operated for one or more purposes. Purely by way of example, the valve 28 may be operated during an engine braking operation and/or during a heat mode of the internal combustion engine system 4. It may be desired to operate the valve 28 in order to obtain certain operating characteristics of at least a portion of the internal combustion engine system 4. As such, it may be desired to gain at least indirect knowledge about how a certain, for instance a current, condition of the valve 28 may influence at least a portion of the internal combustion engine system 4.

Figure 3:
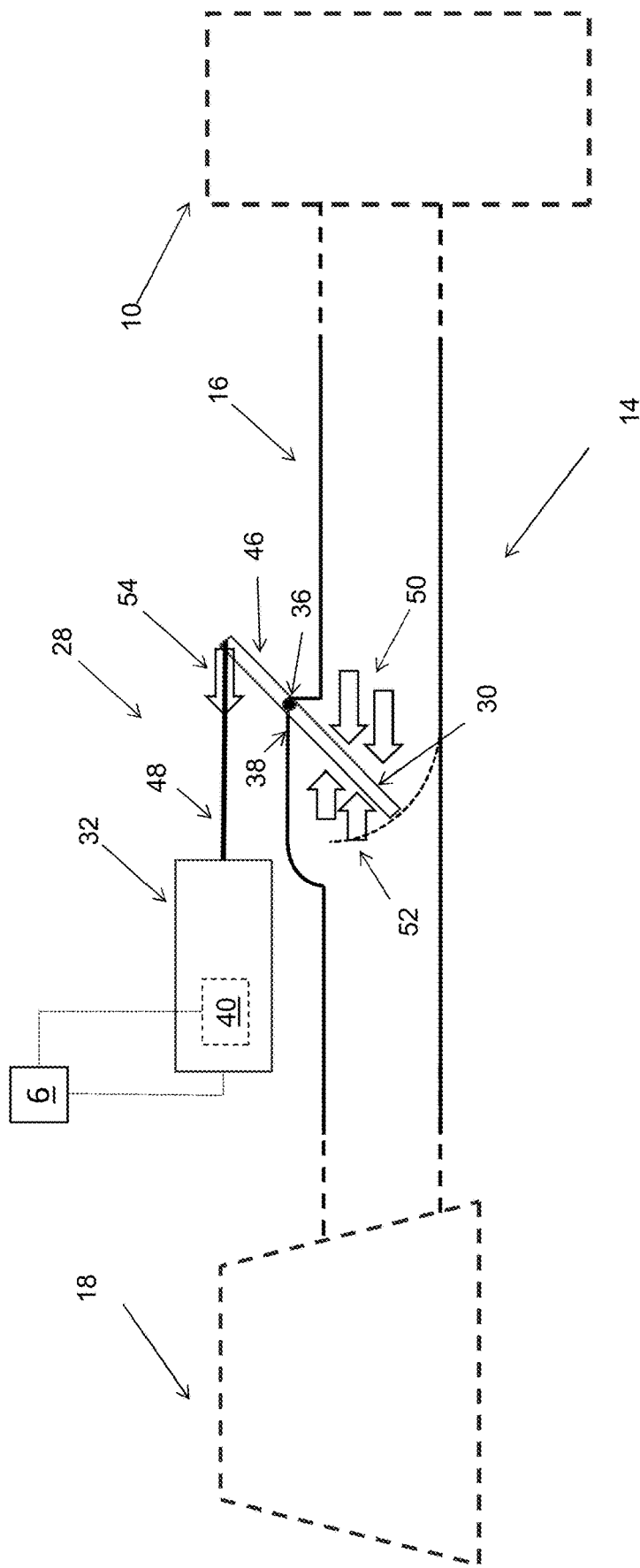
FIG. 3 is a schematic view of an exemplary exhaust system.

To this end, FIG. 3 schematically illustrates an exhaust system 14 comprising a valve 28 comprising a valve flap 30 located in the exhaust conduit 16 in a position between the internal combustion engine 10 and the turbine 18, as seen in a direction of flow from the internal combustion engine 10 to the turbine 18, when the exhaust conduit 16 fluidly connects the internal combustion engine 10 to the turbine 18. As may be gleaned from FIG. 3 the valve flap 30 is pivotally connected to at least a portion of the exhaust conduit 16.

In fact, in the FIG. 3 example, the valve flap 30 is pivotally connected to the exhaust conduit 16 around a pivot axle 36 that is located at least partially in or outside a side wall 38 delimiting the exhaust conduit 16. However, it is envisaged that the valve flap 30 may be pivotally connected to another portion of the exhaust conduit 16. Purely by way of example, the valve flap 30 may be pivotally connected to the exhaust conduit 16 around a pivot axle 36 that is located at least partially within the exhaust conduit 16 internal volume delimited by the side wall 38.

Moreover, with reference to FIG. 3, the exhaust system 14 further comprises an actuator 32 adapted to impart a load on at least a portion of the valve 28 to thereby control a pivotal position of the valve flap 30 in the exhaust conduit 16 to thereby control a gas flow via the exhaust conduit. In the FIG. 3 example, the actuator 32 is a linear actuator adapted to impart a force on at least a portion of the valve 28. However, it is also envisaged that in at least another example, the actuator 32 may be adapted to impart a moment on at least a portion of the valve 28. As such, the actuator need not necessarily be a linear actuator.

Further, the exhaust system 14 comprises an actuator load sensor 40 adapted to detect load information indicative of a magnitude of the load that the actuator 32 currently imparts on at least the portion of the valve 28.

Purely by way of example, the actuator 32 may be an electric actuator and the actuator load sensor 40 may be adapted to detect an electric power value indicative of an electric power fed to the electric actuator. To this end, the actuator load sensor 40 may be adapted to detect at least one of an electric current and an electric voltage fed to the electric actuator and on the basis of the above information determine the above-mentioned load information. As such, the electric current, the electric voltage or a combination thereof may form part of or even constitute the electric power value.

Purely by way of example, the load information may be determined using reference information e.g. a look-up table that for instance may be supplied by the manufacturer of the actuator 32. As non-limiting examples, such a look-up table may present load information a for a plurality of different levels of at least one of the following entities: the electric current, the electric voltage and the electric power.

Figure 4:
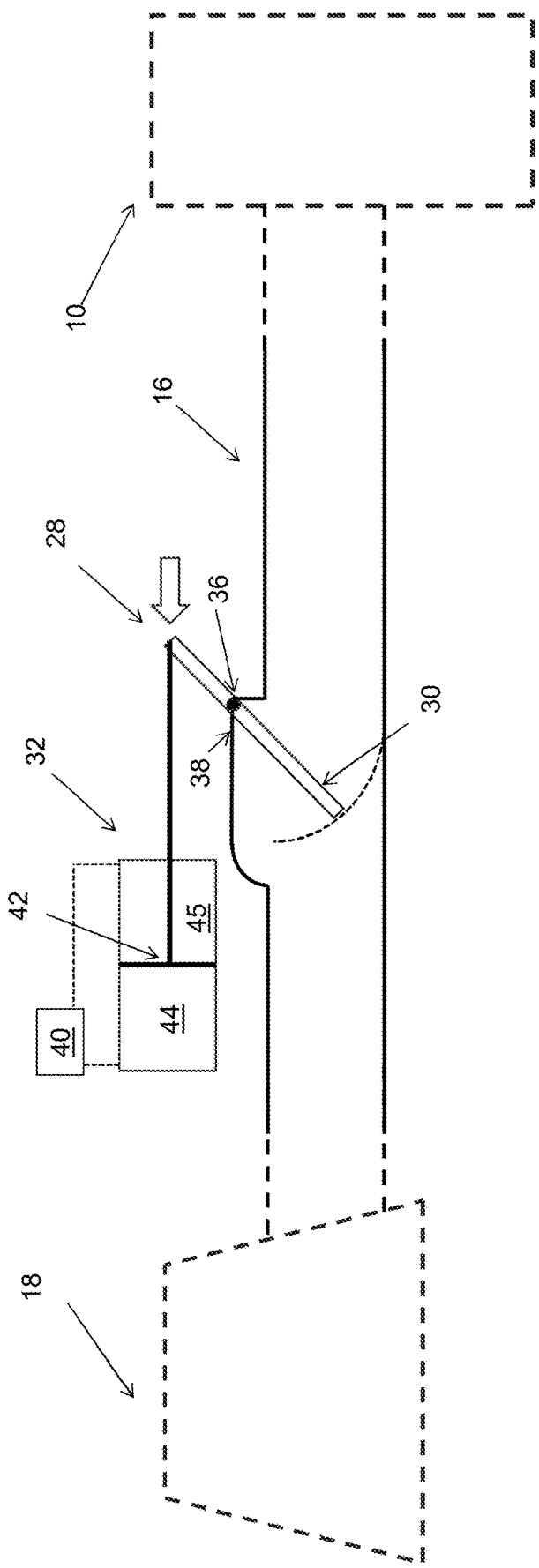
FIG. 4 is a schematic view of an exemplary exhaust system.

As another alternative, as indicated in FIG. 4, the actuator 32 may be a fluid power actuator and the actuator load sensor 40 may be adapted to detect a fluid pressure value indicative of a fluid pressure of the fluid powering the actuator 32. Purely by way of example, and as indicated in FIG. 4, the actuator 32 may comprise a piston 42, a piston chamber 44 and a piston rod chamber 45 and the actuator load sensor 40 may be adapted to detect a fluid pressure in each one of the piston chamber 44 and the piston rod chamber 45.

As non-limiting examples, the fluid used for powering the actuator 32 in the FIG. 4 example may be a gas, such as air, or a liquid, such as a hydraulic liquid, for instance oil. As anon-limiting example, using the fluid pressures in the piston chamber 44 and the piston rod chamber 45, respectively, as well as the area of the piston 42, it is straightforward to determine the load that the actuator is currently imparting on a portion of the valve 28.

Irrespective of the implementation of the actuator, the valve 28 may comprises a valve lever 46, see e.g. FIG. 3, located at least partially outside the exhaust conduit 16. Moreover, the actuator 32 may be adapted to impart a load on at least a portion of the valve lever 46 to thereby control the position of the valve flap 30 in the exhaust conduit 16. To this end, though purely by way of example, the actuator 32 may comprise an actuator arm 48 adapted to transfer an action of the actuator 32, such as a linear load in the FIG. 3 example, to the valve lever 46.

Optionally, and as also exemplified in FIG. 3, the valve flap 30 may be rigidly connected to the valve lever 46. Moreover, as also indicated in FIG. 3, the valve flap 30 and the valve lever 46 may form a unitary component.

Furthermore, as also indicated in FIG. 3, the exhaust system 16 may further comprise a control system 6 adapted to receive load information from the actuator load sensor 40 and to issue control information to the actuator 32 in response to the load information. To this end, as may be realized from FIG. 3, when the valve flap 30 is in a position in which it least partially closes the exhaust conduit 16, an exhaust gas counterpressure 50 will be built up upstream the valve flap 30. Moreover, downstream of the valve flap 30 a back pressure 52 will be imparted on the valve flap 30 in a direction substantially opposite to the direction of the exhaust gas counterpressure 50. The exhaust gas counterpressure 50 and the back pressure 52 will together result in a first moment that will be imparted on the valve flap 30 around e.g. the pivot axle 36. In order to keep the valve flap 30 in position, the actuator 32 needs to impart an actuator load 54 on at least a portion of the valve 28, e.g. the valve lever 46 in the FIG. 3 example, wherein the magnitude of the actuator load 54 is such that a second moment is imparted on the valve 28 around the pivot axle 36 wherein the first moment and the second moment have opposite directions but the same magnitude.

As may be realized from the above, the load information indicative of a magnitude of the load that the actuator 32 currently imparts on at least the portion of the valve 28 may be used for determining information as regards the condition in the exhaust conduit 16. Purely by way of example, the control system 6 may be adapted to determine a counterpressure value, indicative of a current exhaust gas counterpressure 50 in the exhaust conduit 16, upstream of the valve flap 30, as seen in a direction of flow from the internal combustion engine to the turbine, on the basis of the load information. As may be realized from e.g. FIG. 3, in order to determine the above-mentioned counterpressure value on the basis of the load information, certain parameters may be used, such as a lever distance from the point of application of the actuator load, e.g. the connection point between the valve lever 46 and the actuator arm 48 in the FIG. 3 example, to the pivot axle 36 as well as an assumed or determined distribution of the exhaust gas counterpressure 50 on the brake flap 30.

As a non-limiting example, the counterpressure value may be determined by solving an equation of moments in equilibrium around a certain point, such as the pivot axle 36. As another non-limiting example, the counterpressure value may be determined using a look-up table that for instance has been determined using a test procedure using a plurality of different operating conditions with different values for the exhaust gas counterpressure and the actuator load, respectively.

As indicated in FIG. 2, the internal combustion engine system 4 may comprise a turbo 20 that comprises a compressor 22 and the internal combustion engine system 4 may comprise an inlet conduit 56 adapted to fluidly connect the compressor 22 to the internal combustion engine 10. Moreover, as indicated in FIG. 2, the control system 6 may be adapted to receive information indicative of a rotational speed of a compressor 22 of the turbo 20 as well as information about a current charge air pressure downstream the compressor. To this end, the internal combustion engine system 4 may comprise a speed sensor 58 adapted to issue a signal indicative of a rotational speed of the compressor 22 to the control system 6. Purely by way of example, and as indicated in FIG. 2, the speed sensor 58 may be adapted to determine a rotational speed of a shaft 60 connecting the turbine 18 to the compressor 22. Moreover, the internal combustion engine system 4 may comprise a charge air pressure sensor 62 adapted to issue a signal indicative of a charge air pressure in the inlet conduit 56 to the control system 6.

The control system 6 may be adapted to receive information indicative of the rotational speed of a compressor 22 of the turbo 20 as well as information about a current charge air pressure downstream the compressor 22. Moreover, the control system 6 may be adapted to determine an actual air mass flow downstream the compressor 22 on the basis of the counterpressure value, the information about the current charge air pressure downstream the compressor and the information indicative of the rotational speed of the compressor 22.

Figure 5:
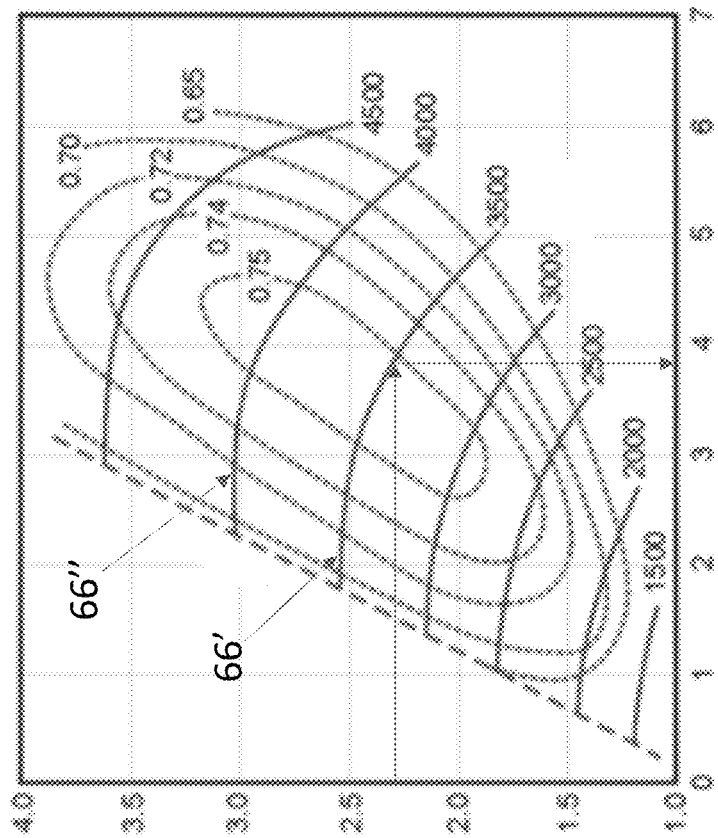
FIG. 5 is graph illustrating iso lines.

To this end, reference is made to FIG. 5 illustrating a graph with iso lines 66', 66" for different rotational speeds of the compressor 22. In the FIG. 5 example, the iso lines range from 1500 rpm to 4500 rpm with increments of 500 rpm therebetween but it is of course envisaged that another set of iso lines may be used. In the FIG. 5 example, the abscissa indicates a mass flow rate and the ordinate indicates a pressure ratio being a ratio between the counterpressure value and the current charge air pressure downstream the compressor. Purely by way of example, the iso lines in FIG. 5 may be determined from analyses using a computational model of the internal combustion engine and/or using a test procedure in which the internal combustion engine system 4 is operated in a plurality of operating conditions. However, irrespectively of how the iso lines are generated, the iso lines may be used such that for the information about the current charge air pressure downstream the compressor and the information indicative of the rotational speed of the compressor 22, a mass flow rate may be determined as indicated in FIG. 5. It should be noted that FIG. 5 only serves as an example of how the counterpressure value, the information about the current charge air pressure downstream the compressor and the information indicative of the rotational speed of the compressor 22 may be used for determining the actual air mass flow downstream the compressor 22 at is envisaged that a plurality of alternative approaches may be used for such a determination. Moreover, should the current rotational speed of the compressor 22 be between two iso lines, techniques such as interpolation may be used.

Irrespective of how the actual air mass flow downstream the compressor 22 has been determined, it may be used for a plurality of different purposes. To this end, with reference to FIG. 2, the internal combustion engine system 4 may comprise an intake throttle valve 64 adapted to control an air mass flow via the inlet conduit 56 and the control system 6 may be adapted to control the intake throttle valve in response to a target air mass flow and the actual air mass flow.

Figure 6:
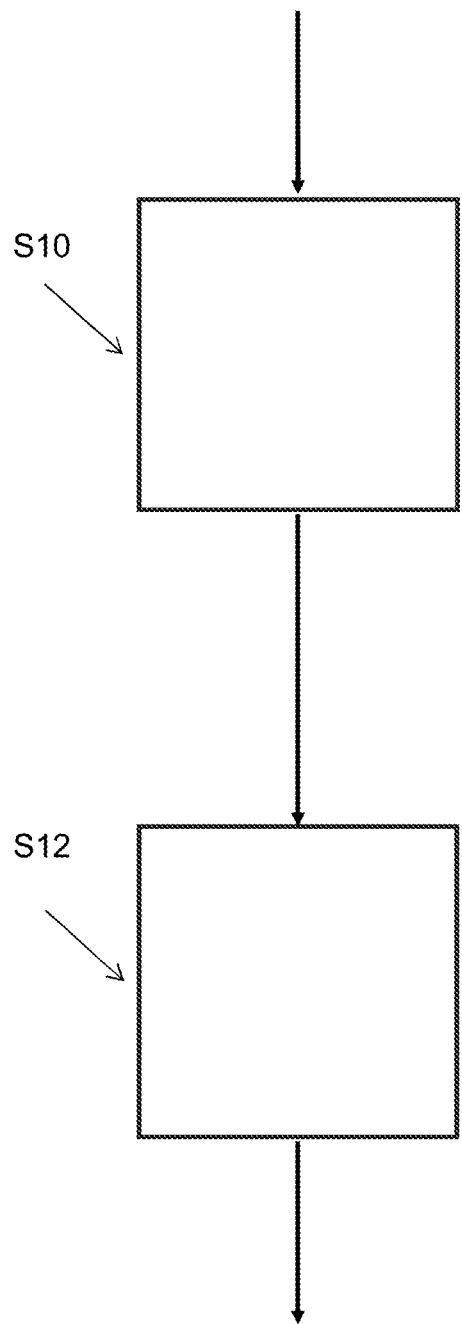
FIG. 6 is a flow chart of an exemplary method.

FIG. 6 is a flow chart illustrating a method of the present disclosure. As such, FIG. 6 illustrates a method for controlling an internal combustion engine system 4 comprising an internal combustion engine 10, a turbo 20, which in turn comprises a turbine 18, and an exhaust system 14. The exhaust system 14 comprises an exhaust conduit 16 adapted to fluidly connect the internal combustion engine 10 to the turbine 18 of the turbo 20. The exhaust system further comprises a valve 28 comprising a valve flap 30 located in the exhaust conduit 16 in a position between the internal combustion engine 10 and the turbine 18, as seen in a direction of flow from the internal combustion engine 10 to the turbine 18. The valve flap 30 is pivotally connected to at least a portion of the exhaust conduit 16. The exhaust system further comprises an actuator 32 adapted to impart a load on at least a portion of the valve 28 to thereby control a pivotal position of the valve flap 30 in the exhaust conduit 16 to thereby control a gas flow via the exhaust conduit 16. The exhaust system 14 further comprises an actuator load sensor 40 adapted to detect load information indicative of a magnitude of the load that the actuator 32 currently imparts on at least the portion of the valve 28. The method comprises:
S10—detecting the load information, and
S12—controlling the actuator 32 in response to the load information.

For the sake of completeness, it should be noted that the above examples relating to the exhaust system 14, the internal combustion engine system 4 and/or the vehicle 2 are equally applicable to the method of the present disclosure.

It should be noted that the present disclosure may be presented in accordance with any one of the below examples.

Example 1: An exhaust system 14 for an internal combustion engine 10, the exhaust system 14 comprising an exhaust conduit 16 adapted to fluidly connect the internal combustion engine 10 to a turbine 18 of a turbo 20, the exhaust system 14 further comprising a valve 28 comprising a valve flap 30 located in the exhaust conduit 16 in a position between the internal combustion engine 10 and the turbine 18, as seen in a direction of flow from the internal combustion engine 10 to the turbine 18, when the exhaust conduit 16 fluidly connects the internal combustion engine 10 to the turbine 18, the valve flap 30 being pivotally connected to at least a portion of the exhaust conduit 16, the exhaust system 14 further comprising an actuator 32 adapted to impart a load on at least a portion of the valve 28 to thereby control a pivotal position of the valve flap 30 in the exhaust conduit 16 to thereby control a gas flow via the exhaust conduit 16, the exhaust system 14 further comprising an actuator load sensor 40 adapted to detect load information indicative of a magnitude of the load that the actuator 32 currently imparts on at least the portion of the valve 28.

Example 2: The exhaust system 14 of example 1, wherein the valve 28 comprises a valve lever 46 located at least partially outside the exhaust conduit 16, the actuator 32 being adapted to impart a load on at least a portion of the valve lever 46 to thereby control the position of the valve flap 30 in the exhaust conduit 16.

Example 3: The exhaust system 14 of example 1 or example 2, wherein the valve flap 30 is rigidly connected to the valve lever 46, preferably the valve flap 30 and the valve lever 46 form a unitary component.

Example 4: The exhaust system 14 of any one of the preceding examples, wherein the actuator 32 is a linear actuator 32.

Example 5: The exhaust system 14 of any one of the preceding examples, wherein the actuator 32 is a fluid power actuator 32 and the actuator load sensor 40 is adapted to detect a fluid pressure value indicative of a fluid pressure of the fluid powering the actuator 32.

Example 6: The exhaust system 14 of any one of examples 1-4, wherein the actuator 32 is an electric actuator 32 and the actuator load sensor 40 is adapted to detect an electric power value indicative of an electric power fed to the electric actuator 32.

Example 7: The exhaust system 14 of any one of the preceding examples, wherein the valve flap 30 is pivotally connected to the exhaust conduit 16 around a pivot axle 36 that is located at least partially in or outside a side wall delimiting the exhaust conduit 16.

Example 8: The exhaust system 14 of any one of the preceding examples, wherein the exhaust system 14 further comprises a control system 6 adapted to receive load information from the actuator load sensor 40 and to issue control information to the actuator 32 in response to the load information.

Example 9: The exhaust system 14 of example 8, wherein the control system 6 is adapted to determine a counterpressure value, indicative of a current exhaust gas counterpressure in the exhaust conduit 16, upstream of the valve flap 30, as seen in a direction of flow from the internal combustion engine 10 to the turbine 18, on the basis of the load information.

Example 10: The exhaust system 14 of example 9, wherein the control system 6 is adapted to receive information indicative of a rotational speed of a compressor 22 of the turbo 20 as well as information about a current charge air pressure downstream the compressor 22, the control system 6 being adapted to determine an actual air mass flow downstream the compressor 22 on the basis of the counterpressure value, the information about the current charge air pressure downstream the compressor 22 and the information indicative of the rotational speed of the compressor 22.

Example 11: An internal combustion engine system 14 comprising an internal combustion engine 10, a turbo 20, which in turn comprises a turbine 18, and an exhaust system 14 of any one of the preceding examples.

Example 12: The internal combustion engine system 14 of example 11, wherein the turbo 20 comprises a compressor 22 and wherein the internal combustion engine system 14 comprises an inlet conduit 56 adapted to fluidly connect the compressor 22 to the internal combustion engine 10.

Example 13: The internal combustion engine system 14 of example 12, when dependent on example 10, further comprising an intake throttle valve 64 adapted to control an air mass flow via the inlet conduit 56, the control system 6 being adapted to control the intake throttle valve 64 in response to a target air mass flow and the actual air mass flow.

Example 14: A vehicle comprising an exhaust system 14 of any one of examples 1-9 and/or an internal combustion engine system 14 according to any one of examples 10-13.

Example 15: A method for controlling an internal combustion engine system 14 comprising an internal combustion engine 10, a turbo 20, which in turn comprises a turbine 18, and an exhaust system 14, the exhaust system 14 comprising an exhaust conduit 16 adapted to fluidly connect the internal combustion engine 10 to the turbine 18 of the turbo 20, the exhaust system 14 further comprising a valve 28 comprising a valve flap 30 located in the exhaust conduit 16 in a position between the internal combustion engine 10 and the turbine 18, as seen in a direction of flow from the internal combustion engine 10 to the turbine 18, the valve flap 30 being pivotally connected to at least a portion of the exhaust conduit 16, the exhaust system 14 further comprising an actuator 32 adapted to impart a load on at least a portion of the valve 28 to thereby control a pivotal position of the valve flap 30 in the exhaust conduit 16 to thereby control a gas flow via the exhaust conduit 16, the exhaust system 14 further comprising an actuator load sensor 40 adapted to detect load information indicative of a magnitude of the load that the actuator 32 currently imparts on at least the portion of the valve 28, the method comprising:
detecting the load information, and
controlling the actuator 32 in response to the load information.

Example 16: The method of example 15, further comprising determining a counterpressure value, indicative of a current exhaust gas counterpressure in the exhaust conduit 16, upstream of the valve flap 30, as seen in a direction of flow from the internal combustion engine 10 to the turbine 18, on the basis of the load information.

Example 17: The method of example 16, wherein the turbo 20 comprises a compressor 22 and wherein the method further comprises determining information indicative of a rotational speed of a compressor 22 of the turbo 20 as well as information about a current charge air pressure downstream the compressor 22, the method further comprising determining an actual air mass flow downstream the compressor 22 on the basis of the counterpressure value, the information about the current charge air pressure downstream the compressor 22 and the information indicative of the rotational speed of the compressor 22.

Example 18: The method of example 17, wherein the internal combustion engine system 14 comprises an inlet conduit 56 adapted to fluidly connect the compressor 22 to the internal combustion engine 10, the internal combustion engine system 14 further comprising an intake throttle valve 64 adapted to control an air mass flow via the inlet conduit 56, the method comprising controlling the intake throttle valve 28 in response to a target air mass flow and the actual air mass flow.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. An exhaust system for an internal combustion engine, said exhaust system comprising an exhaust conduit adapted to fluidly connect said internal combustion engine to a turbine of a turbo, said exhaust system further comprising a valve comprising a valve flap located in said exhaust conduit in a position between said internal combustion engine and said turbine, as seen in a direction of flow from said internal combustion engine to said turbine, when said exhaust conduit fluidly connects said internal combustion engine to said turbine, said valve flap being pivotally connected to at least a portion of said exhaust conduit, said exhaust system further comprising an actuator adapted to impart a load on at least a portion of said valve to thereby control a pivotal position of said valve flap in said exhaust conduit to thereby control a gas flow via said exhaust conduit, said exhaust system further comprising an actuator load sensor adapted to detect load information indicative of a magnitude of the load that the actuator currently imparts on at least said portion of said valve, wherein said valve comprises a valve lever located at least partially outside said exhaust conduit, said actuator being adapted to impart a load on at least a portion of said valve lever to thereby control said position of said valve flap in said exhaust conduit.

2. The exhaust system of claim 1, wherein said valve flap is rigidly connected to said valve lever.

3. The exhaust system of claim 1, wherein said actuator is a linear actuator.

4. The exhaust system of claim 1, wherein said actuator is a fluid power actuator and said actuator load sensor is adapted to detect a fluid pressure value indicative of a fluid pressure of a fluid powering said actuator, or wherein said actuator is an electric actuator and said actuator load sensor is adapted to detect an electric power value indicative of an electric power fed to said electric actuator.

5. The exhaust system of claim 1, wherein said valve flap is pivotally connected to said exhaust conduit around a pivot axle that is located at least partially in or outside a side wall delimiting said exhaust conduit.

6. The exhaust system of claim 1, wherein said exhaust system further comprises a control system adapted to receive load information from said actuator load sensor and to issue control information to said actuator in response to said load information.

7. An internal combustion engine system comprising an internal combustion engine, a turbo, which in turn comprises a turbine, and an exhaust system of claim 1.

8. The internal combustion engine system of claim 7, wherein said turbo comprises a compressor and wherein said internal combustion engine system comprises an inlet conduit adapted to fluidly connect said compressor to said internal combustion engine.

9. The internal combustion engine system of claim 8, wherein said exhaust system further comprises a control system adapted to receive load information from said actuator load sensor and to issue control information to said actuator in response to said load information, wherein said control system is adapted to determine a counterpressure value, indicative of a current exhaust gas counterpressure in said exhaust conduit, upstream of said valve flap, as seen in a direction of flow from said internal combustion engine to said turbine, on the basis of said load information, wherein said control system is adapted to receive information indicative of a rotational speed of a compressor of said turbo as well as information about a current charge air pressure downstream said compressor, said control system being adapted to determine an actual air mass flow downstream said compressor on the basis of said counterpressure value, said information about said current charge air pressure downstream said compressor and said information indicative of said rotational speed of said compressor, said internal combustion engine system further comprising an intake throttle valve adapted to control an air mass flow via said inlet conduit, said control system being adapted to control said intake throttle valve in response to a target air mass flow and said actual air mass flow.

10. A vehicle comprising the internal combustion engine system of claim 7.

11. A vehicle comprising the exhaust system of claim 1.

12. An exhaust system for an internal combustion engine, said exhaust system comprising an exhaust conduit adapted to fluidly connect said internal combustion engine to a turbine of a turbo, said exhaust system further comprising a valve comprising a valve flap located in said exhaust conduit in a position between said internal combustion engine and said turbine, as seen in a direction of flow from said internal combustion engine to said turbine, when said exhaust conduit fluidly connects said internal combustion engine to said turbine, said valve flap being pivotally connected to at least a portion of said exhaust conduit, said exhaust system further comprising an actuator adapted to impart a load on at least a portion of said valve to thereby control a pivotal position of said valve flap in said exhaust conduit to thereby control a gas flow via said exhaust conduit, said exhaust system further comprising an actuator load sensor adapted to detect load information indicative of a magnitude of the load that the actuator currently imparts on at least said portion of said valve, wherein said exhaust system further comprises a control system adapted to receive load information from said actuator load sensor and to issue control information to said actuator in response to said load information, wherein said control system is adapted to determine a counterpressure value, indicative of a current exhaust gas counterpressure in said exhaust conduit, upstream of said valve flap, as seen in a direction of flow from said internal combustion engine to said turbine, on the basis of said load information.

13. The exhaust system of claim 12, wherein said control system is adapted to receive information indicative of a rotational speed of a compressor of said turbo as well as information about a current charge air pressure downstream said compressor, said control system being adapted to determine an actual air mass flow downstream said compressor on the basis of said counterpressure value, said information about said current charge air pressure downstream said compressor and said information indicative of said rotational speed of said compressor.

14. A vehicle comprising the exhaust system of claim 12.

15. A method for controlling an internal combustion engine system comprising an internal combustion engine, a turbo, which in turn comprises a turbine, and an exhaust system, said exhaust system comprising an exhaust conduit adapted to fluidly connect said internal combustion engine to the turbine of the turbo, said exhaust system further comprising a valve comprising a valve flap located in said exhaust conduit in a position between said internal combustion engine and said turbine, as seen in a direction of flow from said internal combustion engine to said turbine, said valve flap being pivotally connected to at least a portion of said exhaust conduit, said exhaust system further comprising an actuator adapted to impart a load on at least a portion of said valve to thereby control a pivotal position of said valve flap in said exhaust conduit to thereby control a gas flow via said exhaust conduit, said exhaust system further comprising an actuator load sensor adapted to detect load information indicative of a magnitude of the load that the actuator currently imparts on at least said portion of said valve, said method comprising:

detecting said load information, and controlling said actuator in response to said load information, said method further comprising determining a counterpressure value, indicative of a current exhaust gas counterpressure in said exhaust conduit, upstream of said valve flap, as seen in a direction of flow from said internal combustion engine to said turbine, on the basis of said load information, wherein said turbo comprises a compressor and wherein the method further comprises determining information indicative of a rotational speed of a compressor of said turbo as well as information about a current charge air pressure downstream said compressor, said method further comprising determining an actual air mass flow downstream said compressor on the basis of said counterpressure value, said information about said current charge air pressure downstream said compressor and said information indicative of said rotational speed of said compressor, said internal combustion engine system comprises an inlet conduit adapted to fluidly connect said compressor to said internal combustion engine, said internal combustion engine system further comprising an intake throttle valve adapted to control an air mass flow via said inlet conduit, said method comprising controlling said intake throttle valve in response to a target air mass flow and said actual air mass flow.

* * * * *